US006665091B1

(12) United States Patent
Saruta

(10) Patent No.: US 6,665,091 B1
(45) Date of Patent: Dec. 16, 2003

(54) PRINTING APPARATUS, METHOD OF PRINTING, AND RECORDING MEDIUM TO ACTUALIZE THE PRINTING APPARATUS

(75) Inventor: Toshihisa Saruta, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/233,193

(22) Filed: Jan. 20, 1999

(30) Foreign Application Priority Data

Jan. 21, 1998 (JP) .......................................... 10-025116

(51) Int. Cl.[7] ............................ G06F 15/00; G06K 1/00

(52) U.S. Cl. .......................... 358/1.5; 358/1.9; 358/1.1; 358/1.8; 358/1.12; 358/1.16; 358/502; 347/20; 347/9; 347/41

(58) Field of Search .......................... 358/1.9, 1.5, 502, 358/1.1, 1.8, 1.12, 1.16; 347/20, 9, 41

(56) References Cited

U.S. PATENT DOCUMENTS 4,686,538 A 8/1987 Kouzato
4,748,453 A * 5/1988 Lin et al. .................... 347/105
5,500,661 A * 3/1996 Matsubara et al. ........... 347/16
5,625,391 A * 4/1997 Hirabayashi et al. ......... 347/41
5,742,743 A * 4/1998 Weiss ......................... 358/1.9
5,988,790 A * 11/1999 Koike et al. .................. 347/41
6,019,454 A * 2/2000 Serra et al. ................... 347/41
6,086,185 A * 7/2000 Inui et al. ..................... 347/43
6,099,104 A * 8/2000 Sato et al. .................... 347/15
6,106,093 A * 8/2000 Nagoshi et al. ............... 347/15
6,134,020 A * 10/2000 Masumoto et al. ........ 358/1.16
6,168,320 B1 * 1/2001 Ono et al. ..................... 347/1
6,219,153 B1 * 4/2001 Kawanabe et al. ........... 347/14
6,267,476 B1 * 7/2001 Kato et al. .................. 347/100
6,547,355 B1 * 4/2003 Shimada et al. .............. 347/12

FOREIGN PATENT DOCUMENTS

| | | |
|---|---|---|
| EP | 0 590 849 | 4/1994 |
| EP | 0 622 211 | 11/1994 |
| EP | 0 622 229 | 11/1994 |
| EP | 0 719 647 | 7/1996 |
| JP | 59-201864 | 11/1984 |
| JP | 6-336015 | 12/1994 |

* cited by examiner

*Primary Examiner*—Kimberly A. Williams
*Assistant Examiner*—Ashanti Ghee
(74) *Attorney, Agent, or Firm*—Oblon, Spivak, McClelland, Maier & Neustadt, P.C.

(57) ABSTRACT

An ink jet printer enabling dual-way printing has a head that can create different types of dots having different diameters. The printer creates small dots in the course of the backward movement of the head, and medium dots in the course of the forward movement of the head. This arrangement effectively prevents the positional misalignment of each type of dots in the main scanning direction. The positional misalignment of the dots in the main scanning direction significantly affects the picture quality in the case of a vertical ruled line formed with only the large dots or in the case of a low tone are expressed with only the small dots.

12 Claims, 15 Drawing Sheets

(b) RELATED ART

PRINTING APPARATUS, METHOD OF PRINTING, AND RECORDING MEDIUM TO ACTUALIZE THE PRINTING APPARATUS

BACKGROUND OF THE INVENTION

1. Field of the Invention

The present invention relates to a printing apparatus that creates dots in the course of a main scan both in a forward direction and in a backward direction and thereby records an image on a printing medium, as well as to a method of such printing and a recording medium to actualize the printing apparatus.

2. Description of the Related Art

Color printers with a head that can spout inks of several different colors are widely used as an output device of a computer system to print a multi-color image that has been processed by a computer. One proposed technique for such printers creates dots in the course of not only a forward movement but a backward movement of a head for the main scan, which moves the head forward and backward relative to a printing medium. The dot creation by this technique is hereinafter referred to as the dual-way printing.

One procedure of the dual-way printing creates part of the dots included in one raster line with one nozzle in the course of a forward movement of the head, while creating the remaining dots of the raster line with another nozzle in the course of a backward movement of the head. Namely all the dots included in one raster line are completed by the forward and backward movements of the head. This recording method, which records one raster line with different nozzles, disperses the positional displacement of the dots due to mechanical errors in the manufacture of nozzles and thereby improves the picture quality.

Another procedure of the dual-way printing creates all the dots included in one raster line in the course of a forward movement of the head, while creating all the dots included in another raster line in the course of a backward movement of the head. Compared with the single-way printing, this recording method doubles the efficiency of dot creation and thereby enhances the printing speed.

Another proposed technique for the conventional printer having only the binary tone expression (on-off) for each dot enhances the number of tones expressible for each dot. One structure of this technique provides two inks of different densities for an identical hue (see, for example, JAPANESE PATENT LAID-OPEN GAZETTE No. 8-209232). Another structure of this technique enables creation of several different types of dots having different diameters (see, for example, JAPANESE PATENT LAID-OPEN GAZETTE No. 59-201864). These procedures enrich the tone expression of the printer and improve the picture quality of a resulting image.

With an improvement in picture quality of the resulting image output from the printer, it is highly demanded to make the high picture quality compatible with the high printing speed. In order to fulfill these requirements, the inventors of the present invention tried to apply the dual-way printing that enhances the printing speed for the printer that can create dots of different diameters. The dual-way printing may, however, cause the positions of the dots created in the course of a backward movement of the head to be deviated from the expected positions based on the positions of the dots created in the course of a forward movement of the head. This results in non-allowable deterioration of the picture quality. Such positional misalignment of the dots is ascribed to a backlash or play required for the driving mechanism of the printer as well as to a difference in thickness of paper used as the printing medium.

FIG. 13 shows a state of causing positional misalignment of the dots due to a difference in thickness of paper. Referring to FIG. 13(*a*), a dot dt11 is created on a sheet of paper PA1 in the forward direction of the main scan, whereas a dot dt12 is created in the backward direction of the main scan to be located adjacent to the dot dt11. A nozzle Nz jets ink droplets Ik11 and Ik12 at the positions shown in FIG. 13(*a*) by taking into account the speeds in the forward direction and the backward direction of the main scan. These ink droplets Ik11 and Ik12 draw the loci shown in FIG. 13(*a*) and reach the target positions on the paper PA1 to create the dots dt11 and dt12.

FIG. 13(*b*) shows the state of dot creation on a sheet of paper PA2 having a greater thickness. The distance between the nozzle Nz and the paper PA2 in FIG. 13(*b*) is smaller than the distance between the nozzle Nz and the paper PA1 in FIG. 13(*a*). If the ink droplets are jetted at the identical timings with those of FIG. 13(*a*) in both the forward direction and the backward direction of the main scan, ink droplets Ik21 and Ik22 draw the loci shown in FIG. 13(*b*) and hit the paper PA2 to create the dots dt21 and dt22. This causes the dots dt21 and dt22 not to be located adjacent to each other and thereby does not give a desired image. In order to obtain a desired image, it is required to delay the ink jet timing in the backward direction of the main scan. Since the difference in thickness of paper may cause the positional misalignment of the dots in the main scanning direction in the case of dual-way printing, it is difficult to completely eliminate the possibility of positional misalignment by the fine regulation at the time of shipment of the printer.

FIG. 14 shows an example of dot creation by a head with a plurality of nozzles in the conventional dual-way printing. In the left part of FIG. 14, both the symbols, the circle O and the square □, with numerals included therein denote an identical nozzle array. The circles O represent the positions of the respective nozzles in the course of a forward movement of the head, whereas the squares □ represent the positions of the respective nozzles in the course of a backward movement of the head. The numerals are assigned to the respective nozzles included in the nozzle array, for convenience of explanation. Each of the symbols P1, P2, . . . affixed to the nozzle array represents the number of times of the main scan. After each main scan, a sub-scan is carried out to feed the sheet of paper by a fixed amount of 5 raster lines. A desired image is recorded by creating all the dots in raster lines by the respective main scans.

The right part of FIG. 14 shows dots recorded by the scans of the head. This example forms a vertical ruled line having the width of 2 dots in the main scanning direction. The vertical line is generally formed with dots of a large diameter (hereinafter referred to as large dots), in order to emphasize the contrast with the background. The circles O and the squares □ represent the dots created in the course of the forward movement and the backward movement of the head, respectively. Raster lines formed in the forward direction of the main scan and raster lines formed in the backward direction of the main scan are arranged alternately. In the example of FIG. 14, the nozzle array includes 13 nozzles and the nozzle pitch in the sub-scanning direction is four times the recording pitch of the image.

As discussed previously with the drawing of FIG. 13, in the case of dual-way printing, the positions of the dots created in the course of a backward movement of the head may be deviated from the positions of the dots created in the course of a forward movement of the head in the main scanning direction. If the dots created in the backward direction of the main scan are displaced rightward relative to the dots created in the forward direction of the main scan, the resulting image is a vertical line where the positions of the dots are periodically changed by every raster line as shown in FIG. 14. This causes the vertical line to be visually recognized as envelopes 11 and 12. Namely the resulting image is recognized not as a straight line but as a wavy curve. The vision of the human is extremely sensitive to such positional misalignment, especially in the vertical direction. Even the displacement of less than one dot as shown in FIG. 14 is recognizable with naked eye. Such positional misalignment is thus not negligible to attain the high picture quality.

FIG. 15 shows the state of dual-way printing that creates the dots of the respective raster lines in the course of both the forward movement and the backward movement of the head to form the vertical ruled line shown in FIG. 14. In this example, part of the dots included in each raster line are created in the course of a forward movement of the head, whereas the remaining dots are created in the course of a backward movement of the head (this technique of dual-way printing is hereinafter referred to as the singling method). The symbols in FIG. 15 have the same meanings as those of FIG. 14. In this case, each raster line is formed by two passes of the main scan in the forward direction and in the backward direction. The sub-scan feeds the paper by 8 raster lines after the forward movement of the head and by 5 raster lines after the backward movement of the head.

If the dots created in the backward direction of the main scan are displaced rightward relative to the dots created in the forward direction of the main scan, the resulting image has the width periodically varied by every raster line as shown in FIG. 15. This causes the vertical line to be visually recognized as envelopes 13 and 14. Namely the image is recognized not as a straight line of a fixed width but as a wavy curve of a periodically varying width.

Such deterioration of the picture quality is also observed in the case where an image is recorded with dots of a small diameter (hereinafter referred to as small dots). FIG. 16 shows an example where small dots are homogeneously dispersed in a certain area. Like the example of FIG. 15, the dual-way printing of the singling method is adopted to record an image in the example of FIG. 16. If the dots created in the backward direction of the main scan are displaced rightward relative to the dots created in the forward direction of the main scan, the dot interval in the main scanning direction is varied in each raster line as shown in FIG. 16. The hatched portions in FIG. 16 have the narrower dot interval and are thereby recognized as dark parts. This damages the homogeneous dispersion of the dots and causes a pattern of varying density to be recognized visually. The image filled with only small dots is often a relatively low tone area where unevenness of dots is conspicuous. The pattern of varying density due to the unevenness of dots is thus not negligible in these areas to attain the high picture quality.

The positional misalignment of the dots in the main scanning direction in the case of dual-way printing is a known problem. The positional misalignment significantly lowers the picture quality to the non-allowable level in the printer that has excellent tone expression and gives an image of high picture quality. The vision of human is extremely sensitive to the phenomenon that causes a vertical ruled line to be visually recognized as a wavy curve (see FIGS. 14 and 15) and to the pattern of varying density in a low-tone area (see FIG. 16). The deterioration of picture quality is especially not allowed in these cases.

SUMMARY OF THE INVENTION

The object of the present invention is thus to provide a technique that prevents deterioration of the picture quality due to the positional misalignment of the dots in the main scanning direction, which are created in the course of a forward movement and a backward movement of a head, in a printing apparatus enabling dual-way printing and that allows the high picture quality to be compatible with the high-speed printing.

At least part of the above and the other related objects is realized by a printing apparatus that carries out a main scan, which moves a head forward and backward relative to a printing medium, and creates a plurality of dots on the printing medium according to input image data, thereby printing an image. The printing apparatus includes: the head that enables creation of at least two different types of dots having different densities per unit area; a storage unit that stores a predetermined relationship between the at least two different types of dots and raster-forming directions of the main scan, wherein the raster-forming directions include a forward direction and a backward direction of the main scan that respectively correspond to the forward movement and the backward movement of the head, the predetermined relationship causing each of the raster-forming directions of the main scan to be mapped to at least one type of dot, wherein there is at least one type of dot created only in either one of the forward direction and the backward direction of the main scan; a first creation unit that drives the head in the forward direction to create the type of dot mapped to the forward direction of the main scan, based on the predetermined relationship; and a second creation unit that drives the head in the backward direction to create the type of dot mapped to the backward direction of the main scan, based on the predetermined relationship.

In the printing apparatus of the present invention, the head can create the at least two different types of dots having different densities per unit area, wherein the raster-forming direction of the main scan is preset for each type of dot. The predetermined relationship between the respective types of dots and the raster-forming directions of the main scan, which is stored in advance, causes each of the forward direction and the backward direction of the main scan to be mapped to at least one type of dot and ensures the existence of at least one type of dot created only in either one of the forward direction and the backward direction of the main scan.

The at least two different types of dots having different densities per unit area may be dots created with inks having different densities with respect to an identical hue or dots of different diameters. These two arrangements may be combined to vary the density of the dots in several stages.

The expression that ‘the predetermined relationship causes each of the forward direction and the backward direction of the main scan to be mapped to at least one type of dot’ does not include the case in which all the different types of dots are created only in either one of the forward direction and the backward direction of the main scan. This is because the object of the present invention is to solve the problems in the dual-way printing.

The expression that ‘the predetermined relationship ensures the existence of at least one type of dot created only in either one of the forward direction and the backward direction of the main scan' does not include the case in which, if there are three different types of dots, A, B, and C, all the types of dots A, B, and C are recorded in both the forward direction and the backward direction of the main scan. It is sufficient that there is at least one type of dot created only in either one of the forward direction and the backward direction of the main scan. It is accordingly not necessary that there are one type of dot created only in the forward direction of the main scan and another type of dot created only in the backward direction of the main scan. By way of example, the above relationship is satisfied in the case where one type of dot A is recorded only in the forward direction of the main scan while the other types of dots B and C are recorded in both the forward direction and the backward direction of the main scan. The above relationship is also satisfied in the case where no type of dot is recorded in both the forward direction and the backward direction of the main scan, for example, in the case where the two types of dots A and B are recorded in the forward direction of the main scan while the other type of dot C is recorded in the backward direction of the main scan.

The following briefly describes the dots having the different densities per unit area. FIG. 17 shows an example of using three different types of dots having different densities per unit area (hereinafter referred to as the 'dark dots', 'medium dots', and 'light dots' in a descending order of the density) according to the image data. In the printing apparatus that creates dots to record an image, the tone expression is implemented by varying the dot recording ratio in a solid area according to the input tone value. Referring to FIG. 17, the ratio of recording the light dots having the lowest density is varied according to the tone value in a low tone area. With an increase in tone value, the ratio of recording the medium dots having the higher density is increased to realize the tone value, which can not be expressed even by the full recording ratio (100%) of the light dots. In an area of high tone values, the dark dots having the highest density are mainly recorded to realize the tone expression. The relationship between the dot recording ratio and the tone value shown in FIG. 17 is only illustrative and not restrictive in any sense.

As clearly understood from FIG. 17, some tone values are implemented by recording only a single type of dots. The analysis of the cases in which the non-allowable deterioration of the picture quality occurs in the dual-way printing has clarified that such deterioration of the picture quality is apparent in an image filled with only a single type of dots having an identical density per unit area. These include the cases of FIGS. 14 and 15 in which only large dots are used to record a vertical ruled line and the case of FIG. 16 in which only small dots are used to express a low tone area.

The present invention takes into account these aspects discussed above. The printing apparatus of the present invention effectively prevents the positional misalignment of the specific type of dots in the main scanning direction, which are created only in either the forward direction or the backward direction of the main scan, in the process of recording an image. This arrangement thereby prevents the non-allowable deterioration of the picture quality in the dual-way printing. This accordingly improves the picture quality in the dual-way printing and enables the high picture quality to be compatible with the high-speed printing.

In accordance with one preferable application of the printing apparatus, the predetermined relationship further causes each type of dot to be unequivocally mapped to either one of the forward direction and the backward direction of the main scan, as well as causing each of the raster-forming directions of the main scan to be mapped to at least one type of dot.

The printing apparatus of this structure effectively prevents the positional misalignment of any type of dots in the main scanning direction in the process of recording an image. This arrangement thus further improves the picture quality in the dual-way printing.

The expression that 'the predetermined relationship causes each type of dot to be unequivocally mapped to either one of the forward direction and the backward direction of the main scan' means that the direction of printing a certain type of dot is determined to be either the forward direction or the backward direction of the main scan. This does not include the case in which, if there are three types of dots A, B, and C, one type of dot A is recorded in both the forward direction and the backward direction. The one-to-one mapping is, however, not essential. The above relationship is satisfied, for example, in the case where the two types of dots A and B are recorded in the forward direction of the main scan while the other type of dot C is recorded in the backward direction of the main scan.

In accordance with another preferable application of the printing apparatus, the at least two different types of dots may be at least two different types of dots having different dot diameters.

Since the dots of different diameters are generally created by the same head, the dual-way printing is significantly advantageous to implement the high-speed dot creation. The principle of the present invention is thus effectively applicable to this case.

In the printing apparatus of this structure, it is preferable that the different dot diameters include two dot diameters, and the predetermined relationship stored in the storage unit causes each of the two dot diameters to be one-to-one mapped to the forward direction and the backward direction of the main scan.

In the printing apparatus of this arrangement, the raster-feeding direction of the main scan is one-to-one mapped to the type of the dot. This enables either one of the different types of dots to be necessarily created in the course of the main scan in any direction. This arrangement effectively prevents a significant decrease in efficiency of dot creation. The principle of the present invention is thus effectively applicable to this case.

In accordance with another aspect of the present invention, the printing apparatus further includes: a third creation unit that drives the head in the forward direction to create the at least two different types of dots, irrespective of the predetermined relationship; and a selection unit that causes the first creation unit and the second creation unit to create dots with respect to a predetermined raster data area of the input image data, wherein the predetermined raster data area affects picture quality of the printed image, the selection unit further causing the third creation unit to create dots with respect to a data area other than the predetermined raster data area.

It is especially preferable that the predetermined raster data area of the input image data causes continuous lines to be formed in a direction that crosses the raster-forming directions of the main scan.

As described above, the positional misalignment of the dots in the main scanning direction significantly affects the picture quality in the specific area where only a single type of dots are created. The selection unit causes the first creation unit and the second creation unit to create dots in the specific area, while causing all the dots in each raster line to be created by one main scan in another area. This arrangement improves the efficiency of dot creation and thereby the printing speed. The lines formed in the direction crossing the main scanning direction may be straight lines or curves. In the case of the straight lines, these lines may cross the main scanning direction at any arbitrary angle.

The present invention is also directed to a method of creating a plurality of dots on a printing medium according to input image data with a head and thereby printing an image, the head enabling at least two different types of dots having different densities per unit area to be created in the course of a forward movement and a backward movement of the head relative to the printing medium. The method includes the steps of: (a) determining a type of dot to be created in each of raster-forming directions of a main scan, based on a predetermined relationship between the at least two different types of dots and the raster-forming directions of the main scan, wherein the raster-forming directions include a forward direction and a backward direction of the main scan that respectively correspond to the forward movement and the backward movement of the head, the predetermined relationship causing each of the raster-forming directions of the main scan to be mapped to at least one type of dot, wherein there is at least one type of dot created only in either one of the forward direction and the backward direction of the main scan; (b) driving the head in the forward direction to create the type of dot mapped to the forward direction of the main scan, based on the predetermined relationship; and (c) driving the head in the backward direction to create the type of dot mapped to the backward direction of the main scan, based on the predetermined relationship.

In accordance with one preferable application of the method, the predetermined relationship further causes each type of dot to be unequivocally mapped to either one of the forward direction and the backward direction of the main scan, as well as causing each of the raster-forming directions of the main scan to be mapped to at least one type of dot.

In accordance with another preferable application of the method, the at least two different types of dots may be at least two different types of dots having different dot diameters.

This method exerts the same effects as those of the printing apparatus discussed above and enables an image of a high picture quality to be printed at a high speed.

In the printing apparatus of the present invention discussed above, a computer may carry out the control operations of the head for recording the dots according to a program. Another application of the present invention is accordingly a recording medium for recording the program.

The present invention is thus directed to a recording medium, in which a program for causing a printing apparatus to create a plurality of dots on a printing medium according to input image data and thereby print an image is recorded in a computer readable manner, wherein the plurality of dots include at least two different types of dots. The program causing a computer to carry out the functions of: storing a predetermined relationship between the at least two different types of dots and raster-forming directions of a main scan, wherein the raster-forming directions include a forward direction and a backward direction of the main scan, the predetermined relationship causing each of the raster-forming directions of the main scan to be mapped to at least one type of dot, wherein there is at least one type of dot created only in either one of the forward direction and the backward direction of the main scan; and causing the printing apparatus to create each type of dot in the raster-forming direction of the main scan mapped to the type of dot.

In accordance with one preferable application of the recording medium, the predetermined relationship further causes each type of dot to be unequivocally mapped to either one of the forward direction and the backward direction of the main scan, as well as causing each of the raster-forming directions of the main scan to be mapped to at least one type of dot.

The at least two different types of dots may be at least two different types of dots having different dot diameters.

The computer executes the program recorded in the recording medium, so as to actualize the printing apparatus of the present invention discussed above.

Available examples of the recording media include flexible disks, CD-ROMS, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application is a program supply apparatus that supplies a computer program, which causes the computer to actualize the above functions, to the computer via a communications path.

These and other objects, features, aspects, and advantages of the present invention will become more apparent from the following detailed description of the preferred embodiment with the accompanying drawings.

DESCRIPTION OF THE PREFERRED EMBODIMENTS

A. Structure of Apparatus

Figure 1:
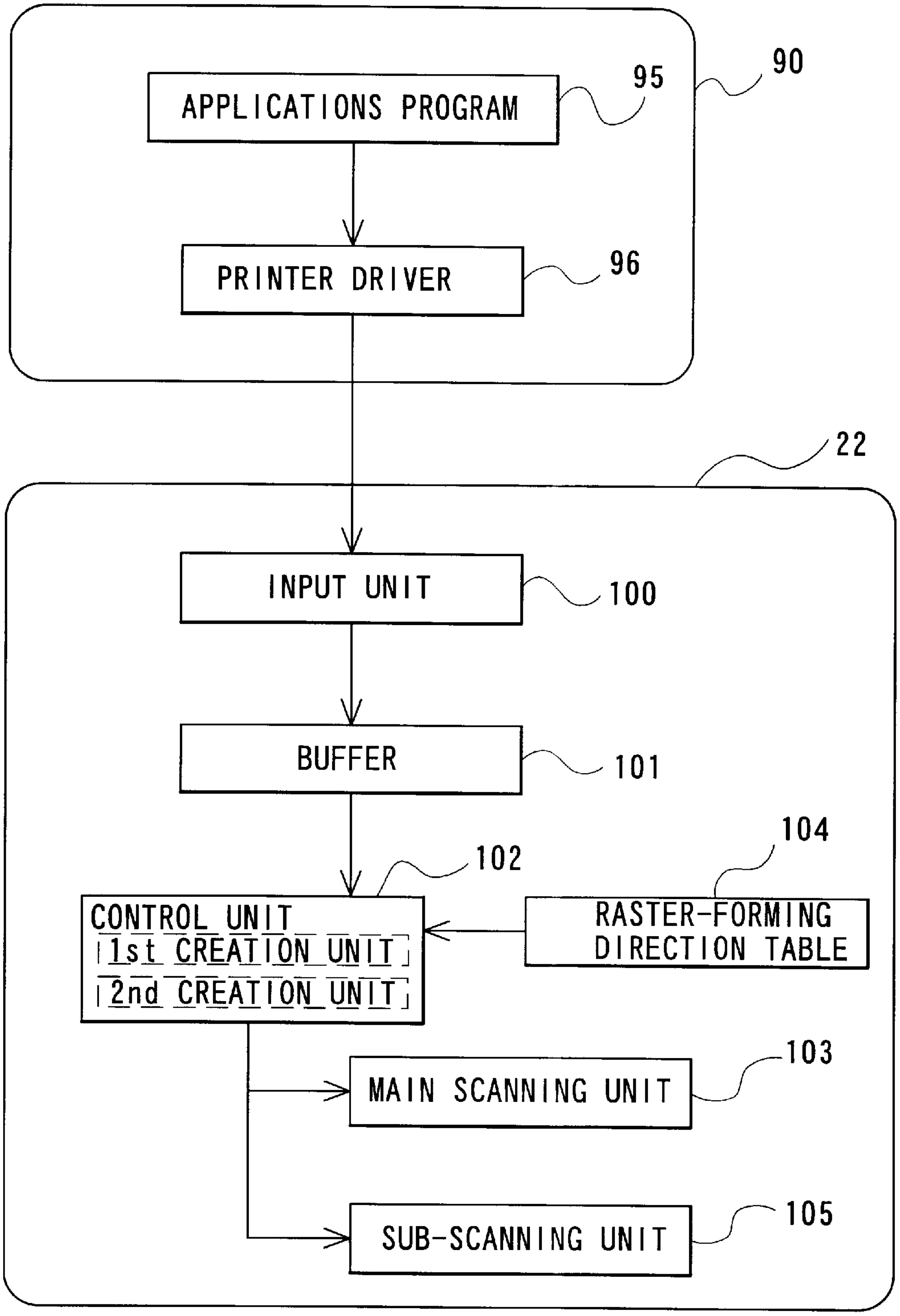
FIG. 1 shows the structure of an image processing system including a printer 22 embodying the present invention.

The outline of the printing system is described with the drawing of FIG. 1, in order to clarify the functions of the printer 22. This printing system includes a personal computer 90 and the color printer 22.

In the computer 90, an applications program 95 for generating image information to be printed works under a predetermined operating system. When the applications program 95 issues a printing command, a printer driver 96 incorporated in the operating system receives the image information from the applications program 95, converts the image information into print data printable by the printer 22, and outputs the print data to the printer 22. According to a concrete procedure, the printer driver 96 carries out color correction to convert the R, G, and B color components of the image information supplied from the applications program 95 into ink colors C, M, Y, and K used by the printer 22. The printer driver 96 also performs halftone processing to express the tone by the dispersibility of dots. The printer 22 can create three different types of dots having different diameters as discussed below. This enables four-value tone expression including non-creation of dots with respect to each pixel. The printer driver 96 sets the on-off state of the three different types of dots with respect to each pixel by the halftone processing.

In the printer 22, the print data from the printer driver 96 is input into an input unit 100 and stored in a buffer 101. A control unit 102 of the printer 22 reads the print data from the buffer 101 and controls a main scanning unit 103 to form raster lines. In this embodiment, the raster-forming directions of the main scan are preset for the respective types of dots and stored in a raster-forming direction table 104. The control unit 102 refers to the raster-forming direction table 104 and specifies the dots to be created corresponding to each raster-forming direction of the main scan. The control unit 102 also controls a sub-scanning unit 105 to implement sub-scans.

Figure 2:
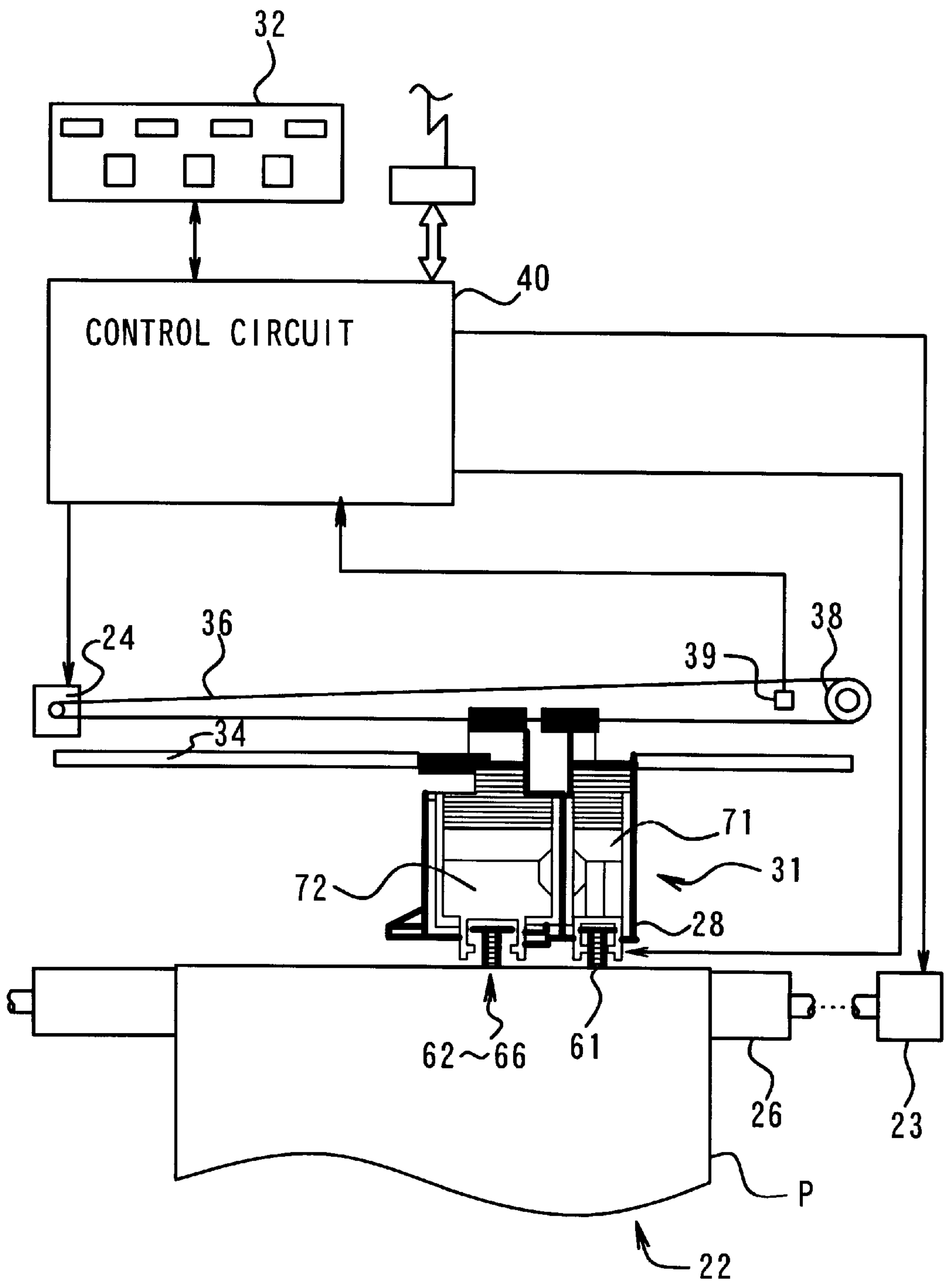
FIG. 2 schematically illustrates the structure of the printer 22.

The schematic structure of the printer 22 is described with the drawing of FIG. 2. As illustrated in FIG. 2, the printer 22 has a mechanism for causing a sheet feed motor 23 to feed a sheet of paper P, a mechanism for causing a carriage motor 24 to reciprocate a carriage 31 in an axial direction of a platen 26, a mechanism for driving a print head 28 mounted on the carriage 31 to control spout of ink and creation of dots, and a control circuit 40 that controls transmission of signals to and from the sheet feed motor 23, the carriage motor 24, the print head 28, and a control panel 32.

A black ink cartridge 71 for black ink (Bk) and a color ink cartridge 72, in which five color inks, that is, cyan (C), light cyan (LC), magenta (M), light magenta (LM), and yellow (Y), are accommodated, may be mounted on the carriage 31 of the printer 22. Both the higher-density ink (dark ink) and the lower-density ink (light ink) are provided for the two colors, cyan and magenta. A total of six ink spout heads 61 through 66 are formed on the print head 28 that is disposed in the lower portion of the carriage 31, and ink supply conduits 67 (see FIG. 3) are formed in the bottom portion of the carriage 31 for leading supplies of inks from ink tanks to the respective ink spout heads 61 through 66. When the black ink cartridge 71 and the color ink cartridge 72 are attached downward to the carriage 31, the ink supply conduits 67 are inserted into connection apertures (not shown) formed in the respective cartridges. This enables supplies of inks to be fed from the respective ink cartridges to the ink spout heads 61 through 66.

Figure 3:
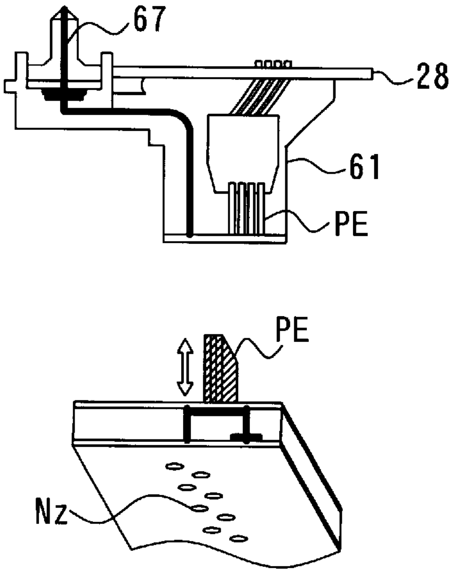
FIG. 3 schematically illustrates the structure of a print head 28 in the printer 22.

The following briefly describes the mechanism of spouting ink. FIG. 3 schematically illustrates the internal structure of the print head 28. When the ink cartridges 71 and 72 are attached to the carriage 31, supplies of inks in the ink cartridges 71 and 72 are sucked out through the ink supply conduits 67 and are led to the ink spout heads 61 through 66 formed in the print head 28 arranged in the lower portion of the carriage 31. In the case where the ink cartridges 71 and 72 are attached to the carriage 31 for the first time, an exclusive pump works to suck first supplies of inks into the respective ink spout heads 61 through 66. In this embodiment, structures of the pump for suction and a cap for covering the print head 28 during the suction are not illustrated nor described specifically.

Figure 4:
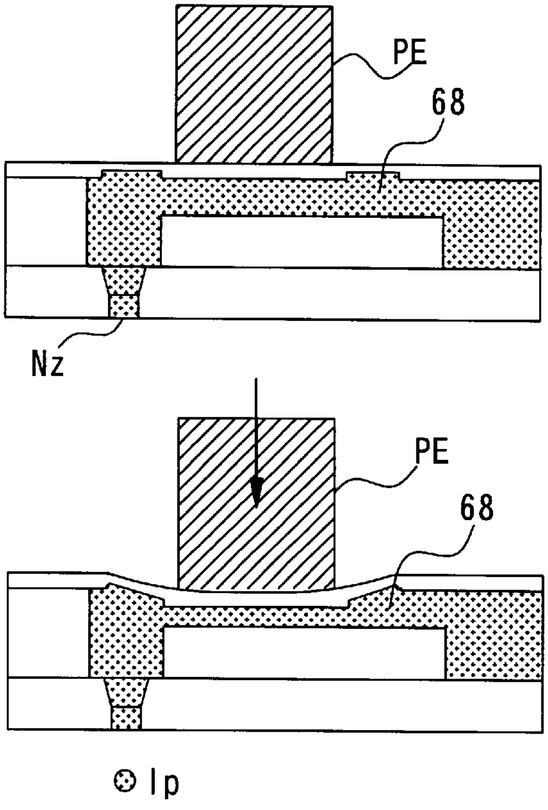
FIG. 4 shows the principle of dot creation in the printer 22.

An array of forty-eight nozzles Nz (see FIG. 6) is formed in each of the ink spout heads 61 through 66 as discussed later. A piezoelectric element PE, which is one of electrically distorting elements and has an excellent response, is arranged for each nozzle Nz. FIG. 4 illustrates a configuration of the piezoelectric element PE and the nozzle Nz. As shown in the upper drawing of FIG. 4, the piezoelectric element PE is disposed at a position that comes into contact with an ink conduit 68 for leading ink to the nozzle Nz. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 4. The volume of the ink conduit 68 is reduced with the extension of the piezoelectric element PE, and a certain amount of ink corresponding to the reduced volume is sprayed as an ink particle Ip from the end of the nozzle Nz at a high speed. The ink particles Ip soak into the sheet of paper P set on the platen 26, so as to implement printing.

The mechanism for feeding the sheet of paper P has a gear train (not shown) that transmits the rotation of the sheet feed motor 23 to the platen 26 as well as to a sheet feed roller (not shown). The mechanism for reciprocating the carriage 31 includes a sliding shaft 34 that is arranged in parallel to the axis of the platen 26 and slidably supports the carriage 31, an endless drive belt 36 that is spanned between the carriage motor 24 and a pulley 38, and a position sensor 39 that detects the position of the origin of the carriage 31.

Figure 5:
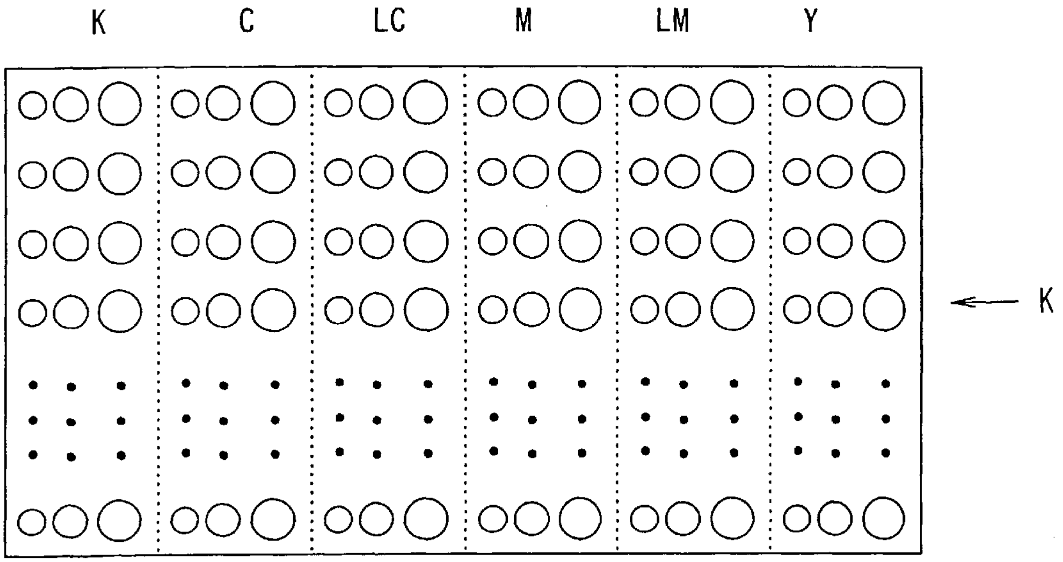
FIG. 5 shows one available nozzle arrangement in the printer 22.
Figure 6:
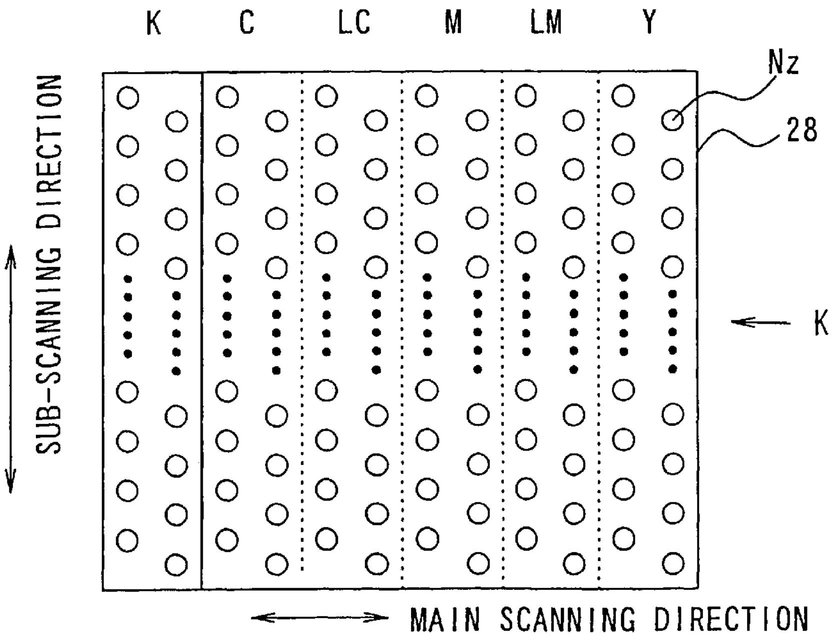
FIG. 6 shows a nozzle arrangement applied for the printer 22.

FIGS. 5 and 6 show available arrangements of the ink jet nozzles Nz on the ink spout heads 61 through 66. The printer 22 of this embodiment can create dots of three different diameters, that is, a large diameter, an intermediate diameter, and a small diameter, with respect to each color. One possible procedure for creating dots of different diameters provides nozzles of different diameters for each color as shown in FIG. 5. The structure of this embodiment, however, uses nozzles of an identical diameter as shown in FIG. 6 and creates dots of different diameters by the control procedure described later. The nozzle arrangement of the embodiment includes six nozzle arrays, wherein each nozzle array spouts ink of each color and includes forty-eight nozzles Nz arranged in zigzag at a fixed nozzle pitch k. In this embodiment, the nozzle pitch is four times the recording pitch of an image in a sub-scanning direction. The positions of the corresponding nozzles in the sub-scanning direction are identical in the respective nozzle arrays. The forty-eight nozzles Nz included in each nozzle array may be arranged in alignment instead of in zigzag. The zigzag arrangement shown in FIG. 6, however, allows a small value to be set to the nozzle pitch k in the manufacturing process.

Figure 7:
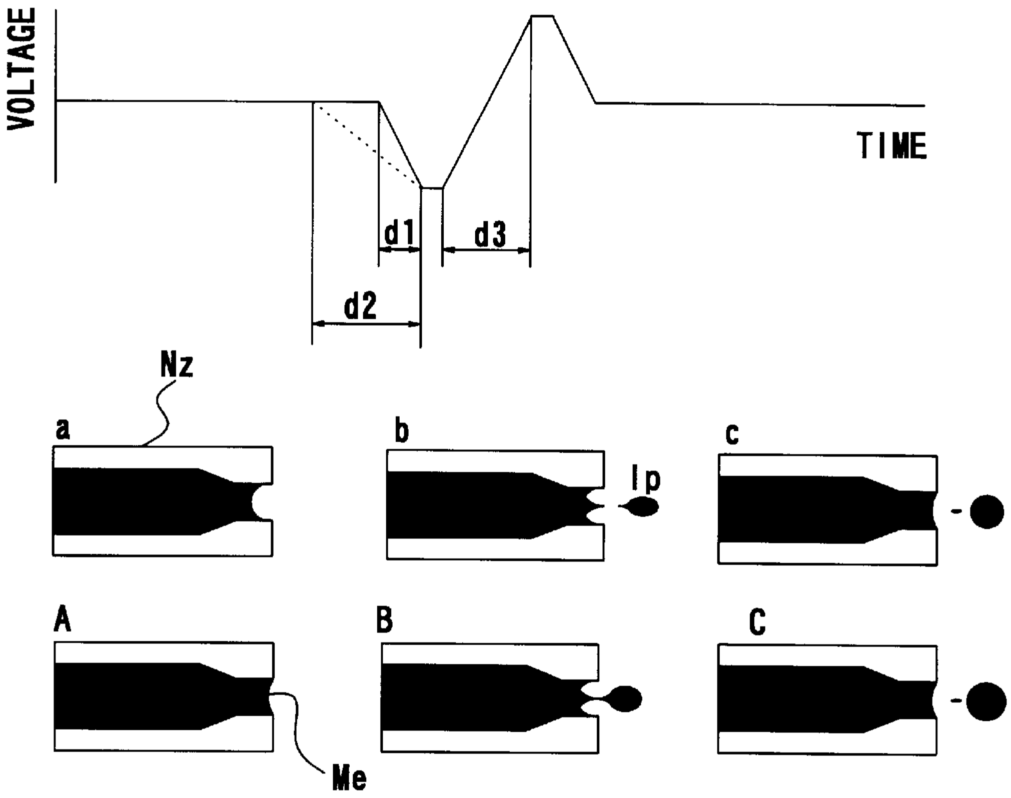
FIG. 7 shows the principle of creating dots of different diameters in the printer 22.

The following describes the principle of creating three different types of dots having different diameters with the nozzles of a fixed diameter. FIG. 7 shows the relationship between the driving waveform of the nozzle Nz and the size of the ink particle Ip spouted from the nozzle Nz. The driving waveform shown by the broken line in FIG. 7 is used to create standard-sized dots. Application of a low voltage to the piezoelectric element PE in a division d2 deforms the piezoelectric element PE in the direction of increasing the cross section of the ink conduit 68, contrary to the case of FIG. 4. As shown in a state A of FIG. 7, an ink interface Me, which is generally referred to as meniscus, is thus slightly concaved inward the nozzle Nz. When the driving waveform shown by the solid line in FIG. 7 is used to abruptly lower the voltage in the division d2, on the other hand, the meniscus is more significantly concaved inward as shown in a state ‘a’, compared with the state A. A subsequent increase in voltage applied to the piezoelectric element PE in a division d3 causes the ink to be spouted, based on the principle described previously with the drawing of FIG. 4. As shown in states B and C, a large ink droplet is spouted when the meniscus is only slightly concaved inward (state A). As shown in states ‘b’ and ‘c’, on the other hand, a small ink droplet is spouted when the meniscus is significantly concaved inward (state ‘a’).

Figure 8:
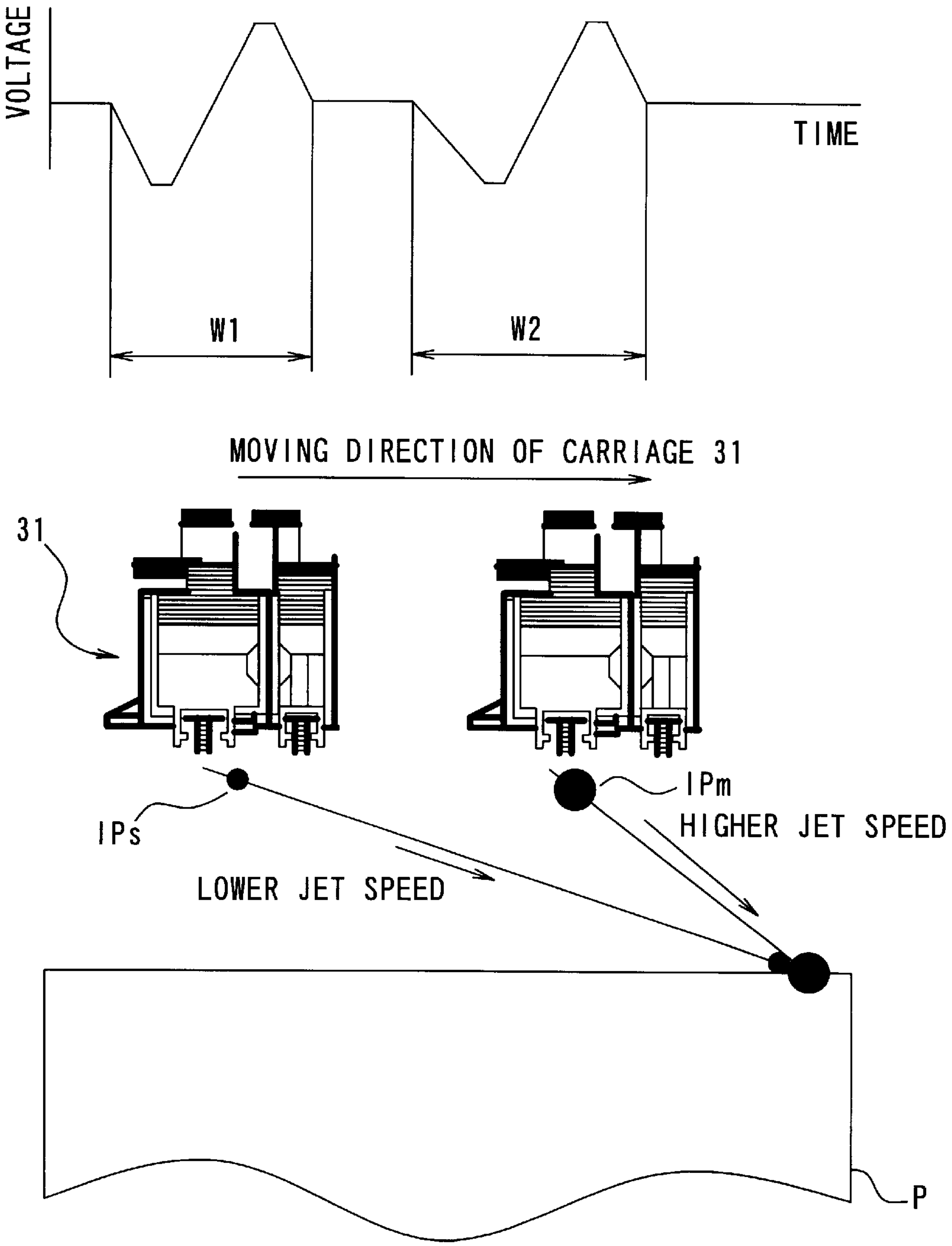
FIG. 8 shows driving waveforms of the nozzle and the state of creating dots in response to the driving waveforms in the printer 22.

As discussed above, the dot diameter can be varied according to the rate of change in the divisions d1 and d2 where the driving voltage decreases. This embodiment provides two different driving waveforms, that is, one for creating dots of a small diameter (hereinafter referred to as small dots) and the other for creating dots of an intermediate diameter (hereinafter referred to as medium dots), based on the relationship between the driving waveform and the dot diameter. FIG. 8 shows driving waveforms used in this embodiment. A driving waveform W1 is used to create the small dots, whereas a driving waveform W2 is used to create the medium dots. These two driving waveforms enable two different types of dots, that is, the small dot and the medium dot, to be created with the nozzle Nz of an identical diameter.

Dots of a large diameter (hereinafter referred to as large dots) are created by using both the driving waveforms W1 and W2 shown in FIG. 8. The lower part of FIG. 8 shows the process of hitting an ink droplet IPs for the small dot and an ink droplet IPm for the medium dot spouted from the nozzle against the sheet of paper P. When both the small dot and the medium dot are created with the driving waveforms of FIG. 8, the ink droplet IPm for the medium dot has a higher jet speed. Namely there is a difference in jet speed between these two types of ink droplets. In the case where a small ink droplet and a medium ink droplet are spouted in this sequence in the course of moving the carriage 31 in a main scanning direction, regulation of the scanning speed of the carriage 31 and the jet timings of both the ink droplets according to the distance between the carriage 31 and the sheet of paper P enables both the ink droplets to reach the sheet of paper P at a substantially identical timing. In this manner, the embodiment creates a large dot having the largest diameter with the two driving waveforms of FIG. 8.

Figure 9:
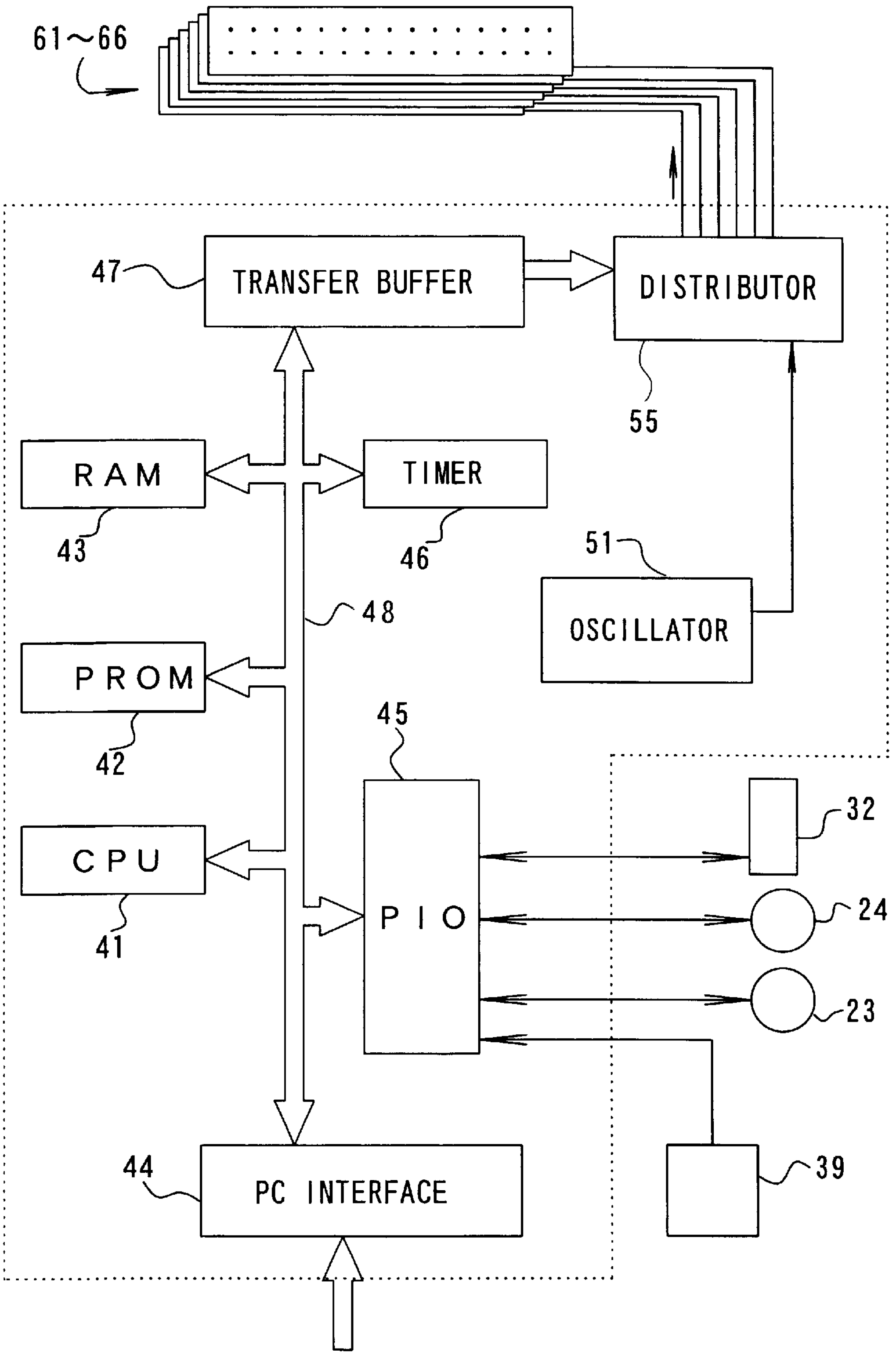
FIG. 9 illustrates the internal structure of a control circuit 40 in the printer 22.

The following describes the internal structure of the control circuit 40 in the printer 22 and the method of driving the print head 28 with the plurality of nozzles Nz shown in FIG. 6. FIG. 9 illustrates the internal structure of the control circuit 40. Referring to FIG. 9, the control circuit 40 includes a CPU 41, a PROM 42, a RAM 43, a PC interface 44 that transmits data to and from the computer 90, a peripheral input-output unit (PIO) 45 that transmits signals to and from the sheet feed motor 23, the carriage motor 24, and the control panel 32, a timer 46 that counts the time, and a transfer buffer 47 that outputs ON-OFF signals of dots to the ink spout heads 61 through 66. These elements and circuits are mutually connected via a bus 48. The control circuit 40 further includes an oscillator 51 that outputs driving waveforms (see FIG. 8) at a predetermined frequency and a distributor 55 that distributes the output of the oscillator 51 into the ink spout heads 61 through 66 at a specified timing. The control circuit 40 receives the dot data processed by the computer 90, temporarily registers the processed dot data into the RAM 43, and outputs the dot data to the transfer buffer 47 at a specific timing. When the data specifying the on-off state of the respective nozzles are output from the transfer buffer 47 to the distributor 55, only the piezoelectric elements PE that receive the ON signal from the transfer buffer 47 are driven according to the driving waveforms. The nozzles corresponding to the piezoelectric elements PE that receive the ON signal from the transfer buffer 47 then spout the ink particles Ip.

The driving waveform W1 for the small dots and the driving waveform W2 for the medium dots are alternately output as shown in FIG. 8. In order to create a small dot with respect to a certain pixel, the process sends the ON signal to a corresponding nozzle synchronously with the driving waveform W1 for the small dots and the OFF signal to the nozzle synchronously with the driving waveform W2 for the medium dots. In order to create a medium dot, on the contrary, the process sends the OFF signal to a corresponding nozzle synchronously with the driving waveform W1 and the ON signal to the nozzle synchronously with the driving waveform W2. In order to create a large dot, the process sends the ON signal to a corresponding nozzle synchronously with both the driving waveforms W1 and W2. Each nozzle array in the printer 22 of this embodiment can thus create the three different types of dots having the different diameters in the course of one main scan.

Another possible structure provides three oscillators that respectively output driving waveforms for creating the three different types of dots, that is, the large dot, the medium dot, and the small dot. The appropriate driving waveform is selected according to the diameter of the dot to be created. It is not necessary to restrict the available dot diameters to the above three types, the large, the intermediate, and the small diameters, but a greater number of different driving waveforms may be adopted to increase the number of different dot diameters. One possible application uses only two out of the above three different dot diameters.

As shown in FIG. 6, the ink spout heads 61 through 66 are arranged in the moving direction of the carriage 31, so that the respective nozzle arrays reach a fixed position on the sheet of paper P at different timings. The CPU 41 accordingly takes account of the positional difference of the corresponding nozzles included in the respective ink spout heads 61 through 66 and outputs the ON-OFF signals of dots at required timings via the transfer buffer 47, so as to create dots of the respective colors. The output of the ON-OFF signals is controlled by taking into account the two-column nozzle arrangement on each of the ink spout heads 61 through 66 as shown in FIG. 6.

In the printer 22 having the hardware structure discussed above, while the sheet feed motor 23 rotates the platen 26 and the other related rollers to feed the sheet of paper P (hereinafter referred to as sub-scans), the carriage motor 24 reciprocates the carriage 31 (hereinafter referred to as main scans), simultaneously with actuation of the piezoelectric elements PE on the respective ink spout heads 61 through 66 of the print head 28. The printer 22 accordingly sprays the respective color inks to create dots and thereby forms a multi-color image on the sheet of paper P.

In this embodiment, the printer 22 has the head that uses the piezoelectric elements PE to spout ink (see FIG. 4) as discussed previously. The printer may, however, adopt another technique for spouting ink. One available structure of the printer supplies electricity to a heater installed in an ink conduit and utilizes the bubbles generated in the ink conduit to spout ink.

B. Recording of Image

Figure 10:
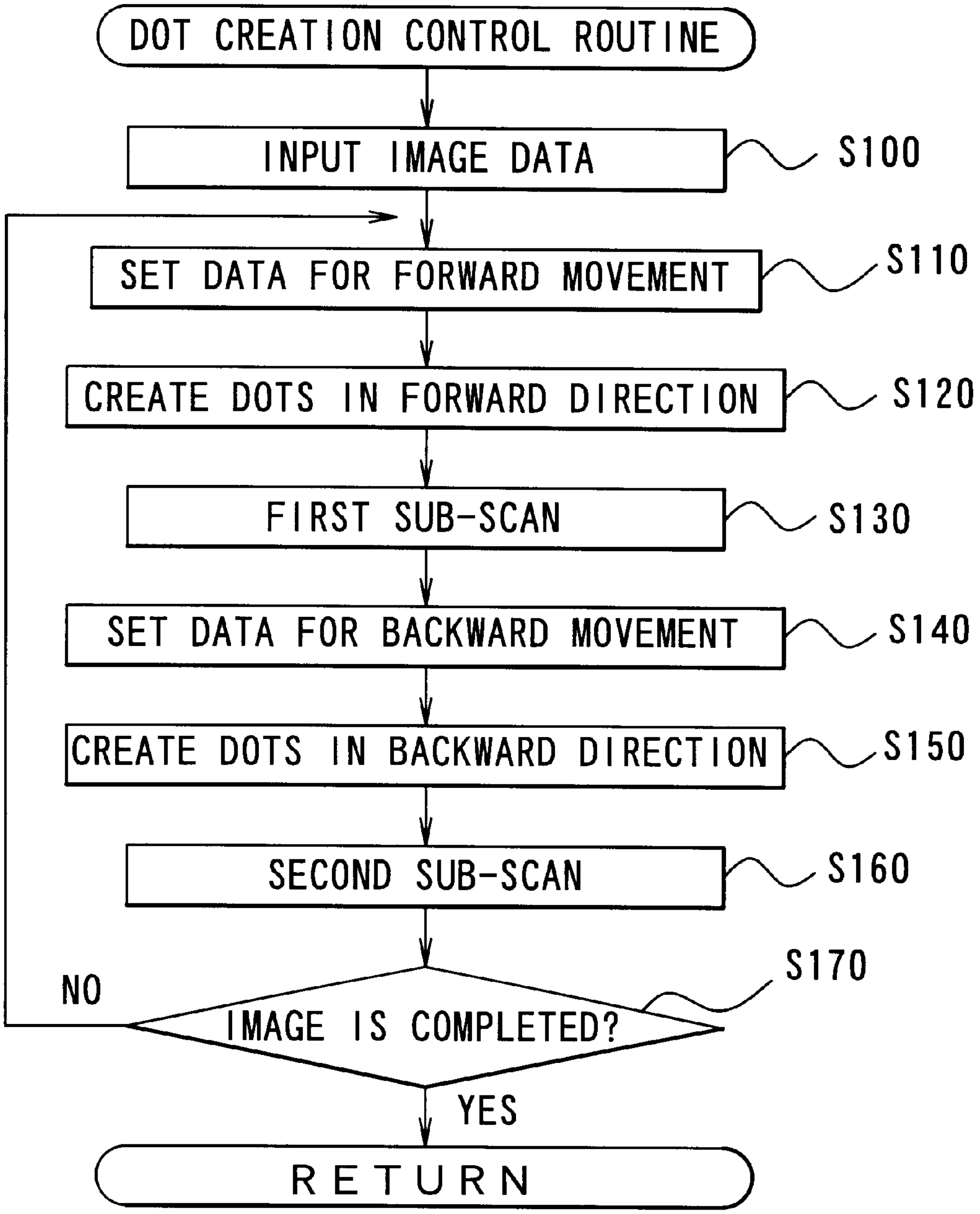
FIG. 10 is a flowchart showing a dot creation control routine executed in this embodiment.
Figure 11:
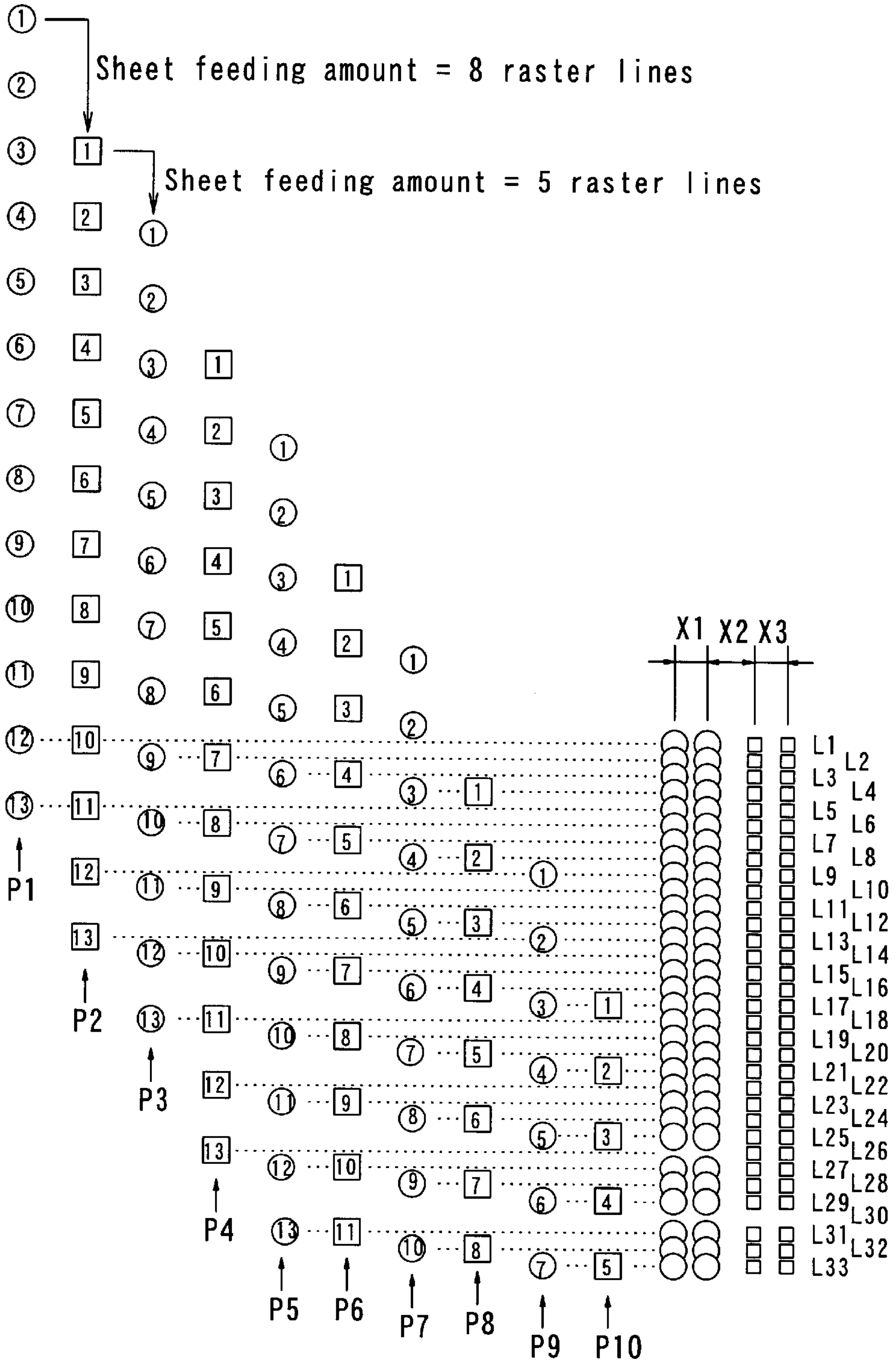
FIG. 11 shows a first state, in which dots are created by the dual-way printing of this embodiment.

The following describes a process of recording an image by the printer 22 of this embodiment. The description regards a concrete procedure of creating dots through the main scans and the sub-scans. FIG. 10 is a flowchart showing a dot creation control routine for controlling main scans and sub-scans executed in this embodiment. FIG. 11 shows a state of dots created by the control procedure. The CPU 41 of the control circuit 40 in the printer 22 shown in FIG. 2 executes the dot creation control routine of FIG. 10 to control the main scans and sub-scans.

The dot creation control routine is described in detail with the flowchart of FIG. 10 and the drawing of FIG. 11. Each ink spout head in the printer 22 of the embodiment actually has forty-eight nozzles as described previously with the drawing of FIG. 6. For the clarity and simplicity of explanation, however, the number of nozzles is reduced to 13 in the example of FIG. 11. The nozzle pitch in this example is four raster lines, which is identical with the value in the structure of the embodiment described above with the drawing of FIG. 6.

In the left part of FIG. 11, both the symbols, the circle O and the square □, with numerals included therein denote an identical nozzle array. The circles O represent the positions of the respective nozzles in the course of a forward movement of the head, whereas the squares represent the positions of the respective nozzles in the course of a backward movement of the head. The numerals are assigned to the respective nozzles included in the nozzle array, for convenience of explanation. Each of the symbols P1, P2, . . . affixed to the nozzle array represents the number of times of the main scan. Each raster line is formed by two passes of the main scan in a forward direction and in a backward direction, which are respectively implemented by a forward movement and a backward movement of the head. The sub-scan feeds the sheet of paper by 8 raster lines after the forward movement and by 5 raster lines after the backward movement.

The right part of FIG. 11 shows dots recorded by the scans of the head. The circles O and the squares □ represent the dots created in the course of the forward movement and the backward movement of the head, respectively. The difference in size of the symbols denotes the difference in diameter of the dots created. The symbols L1, L2, affixed to the respective raster lines represent the raster numbers allocated to the raster lines, for convenience of explanation. In the example of FIG. 11, the circles O represent the medium dots, whereas the squares represent the small dots. No large dots are created in this example.

The procedure of this embodiment presets the relationship between the type of dots and the raster-forming direction of the main scan in the case of dual-way printing. In this embodiment, the medium dots are created in the course of the forward movement of the head, whereas the small dots are created in the course of the backward movement of the head. The settings for creating the large dots will be described later. This relationship is stored as the raster-forming direction table in the PROM 42 of the printer 22. The relationship between the type of dots and the raster-forming direction of the main scan may be varied according to the printing mode.

The dot creation control routine of FIG. 10 is described by referring to the illustration of FIG. 11. When the program enters the dot creation control routine, the CPU 41 first inputs image data at step S100. The image data has been subjected to color correction and other required image processing operations carried out by the printer driver 96 shown in FIG. 2, and specifies which size of the dot is to be created for each color with respect to each pixel. In this embodiment, the procedure of step S100 inputs all the data relating to an image to be printed. Another possible application successively inputs data while creating the required dots.

The CPU 41 then sets the data for creating dots in the course of the forward movement of the head at step S110. The procedure of this embodiment carries out a sub-scan to cause any pair of adjoining raster lines to be formed with different nozzles, in order to cancel the positional displacement of the dots due to mechanical errors in the manufacture of nozzles. This may cause an area with no adjoining raster line according to the sheet feeding amount in the sub-scan (for example, the No. 1 nozzle in the first main scan P1 shown in FIG. 11). In order to prevent such dropout of a raster line, the structure of the embodiment creates dots with the No. 12 and No. 13 nozzles, when the head moves forward in the first main scan P1 as shown in FIG. 11. As discussed previously, in this embodiment, the medium dots are created in the course of the forward movement of the head, whereas the small dots are created in the course of the backward movement of the head. Namely the medium dots are created with these nozzles in the first main scan P1. The nozzle pitch corresponds to the 4 raster lines. The CPU 41 accordingly selects a series of data representing the positions of the medium dots to be created in the main scanning direction, out of the data regarding the upper-most raster line (that is, the raster line L1 in FIG. 11) and the raster line that is below the upper-most raster line by four raster lines (that is, the raster line L5), which are included in the input image data. The selected series of data are transmitted to the transfer buffer 47.

After setting the data for dot creation in the forward direction, the CPU 41 controls the head to move forward (the first main scan P1) and create the medium dots with the nozzles No. 12 and No. 13 at step S120. The dots created here are the medium dots shown by the symbol O in the raster lines L1 and L5 of FIG. 11.

The CPU 41 then carries out a first sub-scan, that is, a sub-scan of 8 raster lines, at step S130. This embodiment adopts the singling method to form each raster line. The sub-scan is thus required to make the positions of some nozzles coincide with the positions of the raster lines, in which dots have been created in the course of the forward movement of the head. This embodiment carries out the sub-scan to make the positions of the No. 10 and No. 13 nozzles respectively coincident with the positions of the raster lines L1 and L5.

The CPU 41 subsequently sets the data for creating dots in the course of the backward movement of the head at step S140. In a similar manner to that for the first main scan P1 discussed above, the concrete procedure of step S140 selects a series of data representing the positions of the small dots to be created in the main scanning direction with respect to the raster lines L1 and L5. In the flowchart of FIG. 10, the data for dot creation in the course of the backward movement is set after conclusion of the first sub-scan (step S130). The processes of steps S130 and S140 may, however, be carried out simultaneously.

After setting the data for dot creation in the backward direction, the CPU 41 controls the head to move backward (the second main scan P2) and create the small dots with the nozzles No. 10 through No. 13 at step S150. The dots created here are the small dots shown by the symbol in the raster lines L1, L5, L9, and L13 of FIG. 11.

The CPU 41 then carries out a second sub-scan, that is, a sub-scan of 5 raster lines, at step S160. Since all the required dots have already been created in the raster lines L1 and L5, this second sub-scan enables dots to be created in the adjoining raster lines. Until a resulting image is completed at step S170, the program repeats the above procedure.

The head moves forward to create the medium dots in the main scans of the odd times, whereas the head moves backward to create the small dots in the main scans of the even times. This completes a final image.

In the example of FIG. 11, the dots created in the course of the backward movement of the head are displaced rightward relative to the dots created in the course of the forward movement of the head. The dot intervals x1, x2, and x3 in the main scanning direction, which are originally supposed to be identical, are actually different because of such rightward displacement as clearly seen from FIG. 11. The interval x1 of the dots created in the course of the forward movement of the head is, however, identical with the interval x3 of the dots created in the course of the backward movement of the head.

Figure 14:
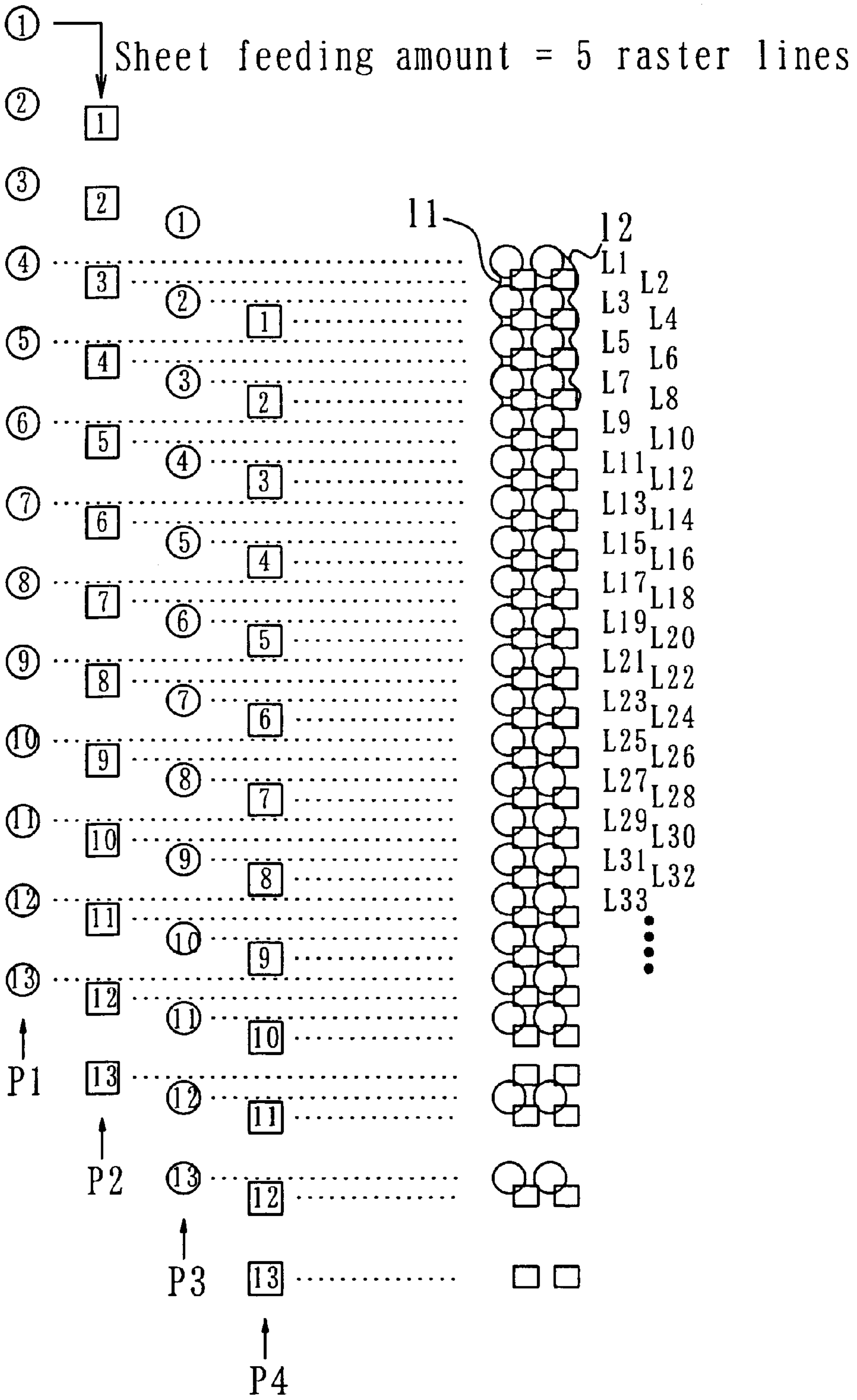
Fig. 14 RELATED ART
FIG. 14 shows a first state, in which dots are created by the conventional dual-way printing.
Figure 15:
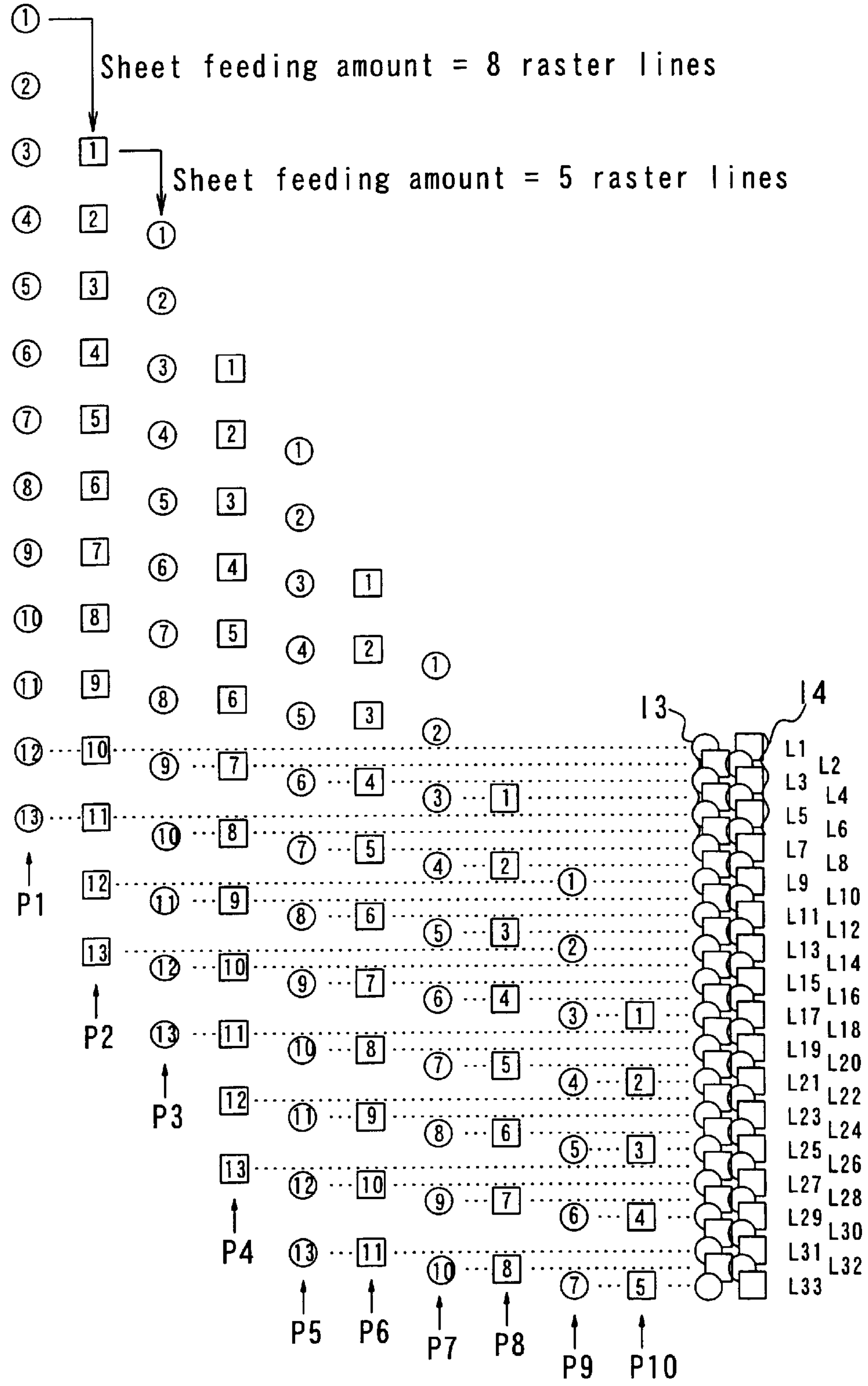
RELATED ART Fig. 15
FIG. 15 shows a second state, in which dots are created by the conventional dual-way printing.
Figure 16:
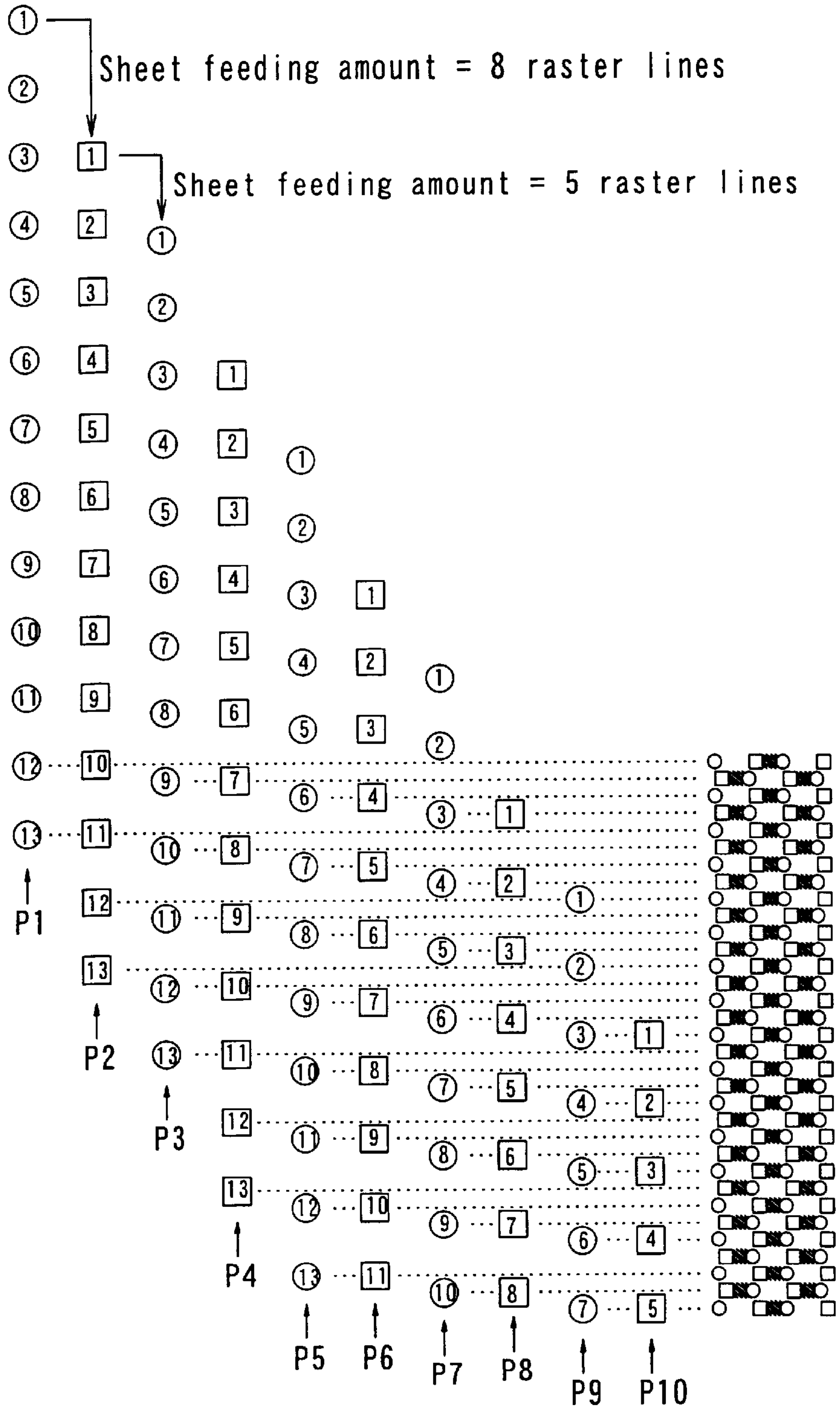
Fig. 16 RELATED ART
FIG. 16 shows a third state, in which dots are created by the conventional dual-way printing.
Figure 17:
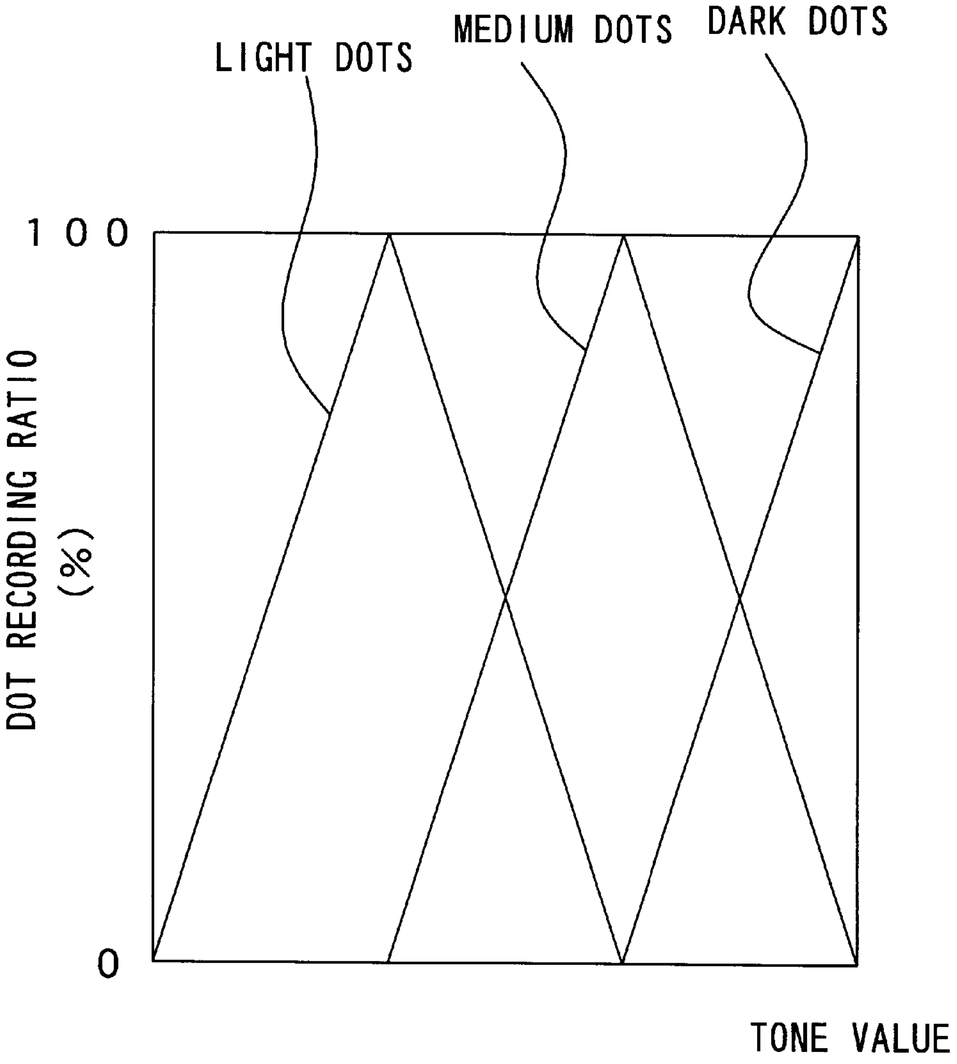
FIG. 17 is a graph showing the recording ratio of the dots having different densities per unit area, plotted against the tone value.

In this printer, the raster-forming direction of the main scan is unequivocally set for each type of the dots, so that there is no positional misalignment in the main scanning direction with respect to each type of the dots. As described previously, the positional misalignment of the dots in the main scanning direction significantly affects the picture quality in the specific area that is filled with a single type of dots. The printer 22 of this embodiment effectively prevents the positional misalignment in the main scanning direction with respect to each type of the dots, thereby remarkably improving the picture quality. For example, in the case where a vertical ruled line is formed with only the medium dots, these dots can be created without any positional misalignment in the main scanning direction as shown in FIG. 11. This ensures formation of a straight line having a strictly fixed width and prevents the ruled line from being recognized as a wavy curve as shown in either FIG. 14 or FIG. 15. This structure also prevents a pattern of varying density as shown in FIG. 16 in an area filled with only the small dots.

The large dots can also be created in such a manner that prevents the positional misalignment in the main scanning direction. The procedure of this embodiment creates the large dots by laying the small dots upon the medium dots as discussed previously with the drawing of FIG. 8. When creation of the large dots is required, the procedure records the small dots in the course of the backward movement of the head to be laid upon the medium dots recorded in the course of the forward movement of the head. There is no positional misalignment of the medium dots as well as of the small dots in the main scanning direction. There is accordingly no positional misalignment of the large dots, which are formed by laying the small dots upon the medium dots, in the main scanning direction. This embodiment does not deal with the large dots as a different type of dots having a different density per unit area, but processes the large dots as the combination of the medium dots and the small dots. The procedure of the embodiment one-to-one maps the medium dots and the small dots respectively to the forward movement and the backward movement of the head, thereby preventing the positional misalignment in the main scanning direction with respect to each type of the dots. A possible modification of this embodiment may create the large dots in the course of only the forward movement or the backward movement of the head.

The printer 22 of this embodiment adopts the dual-way printing to enhance the printing speed. In the case where dots of different diameters coexist in each raster line, the typical procedure successively outputs the two driving waveforms W1 and W2 shown in FIG. 8 and creates the two different types of dots by selectively using these driving waveforms. This arrangement decreases the number of dots created per unit time (hereinafter referred to as the frequency of dot creation). The structure of the embodiment, on the other hand, one-to-one maps each type of the dots to a moving direction of the head for the main scan. This causes only the selected driving waveform (W1 or W2), which is according to the type of the dots to be created, to be successively output for dot creation. This arrangement ensures the high frequency of dot creation. The structure of this embodiment forms each raster line by two or more passes of the main scan. Compared with the conventional structure of creating all the dots in each raster line by one pass of the main scan, this structure of the embodiment has the lower efficiency of dot creation. Because of the high frequency of dot creation, however, the arrangement of this embodiment improves the recording speed of the image as a whole.

As described above, the printer 22 of this embodiment adopts the dual-way printing to enhance the recording speed of an image and one-to-one maps each type of the dots to a raster-forming direction of the main scan to improve the picture quality of the image.

In this embodiment, the sheet feeding amount of the first sub-scan (step S130) is set to be different from the sheet feeding amount of the second sub-scan (step S160). These sheet feeding amounts may, however, be set arbitrarily, for example, may be equal to each other. It is not necessary that the sub-scan is set to form the adjoining raster line by different nozzles.

Figure 12:
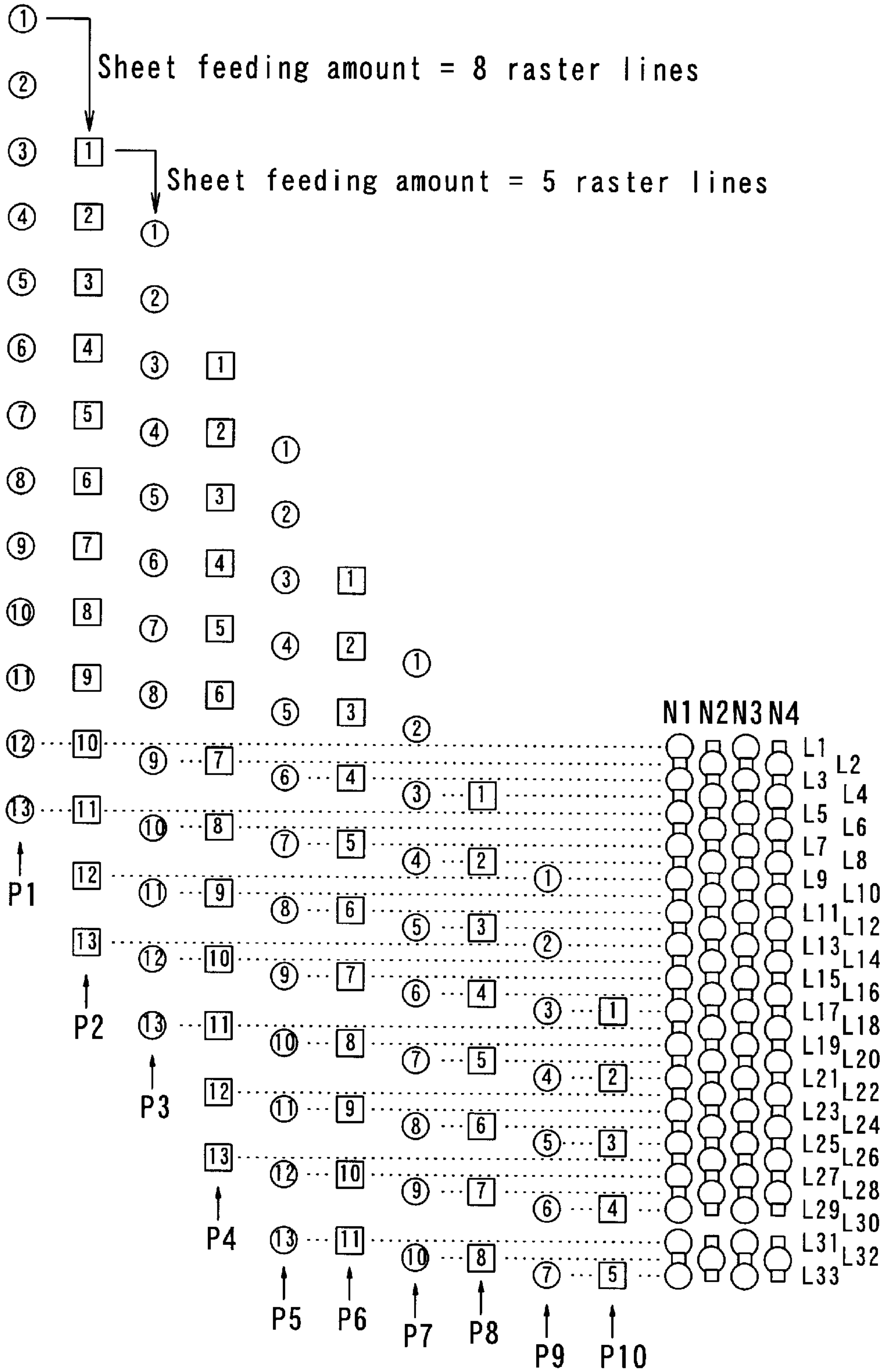
FIG. 12 shows a second state, in which dots are created by the dual-way printing of this embodiment.
Figure 13:
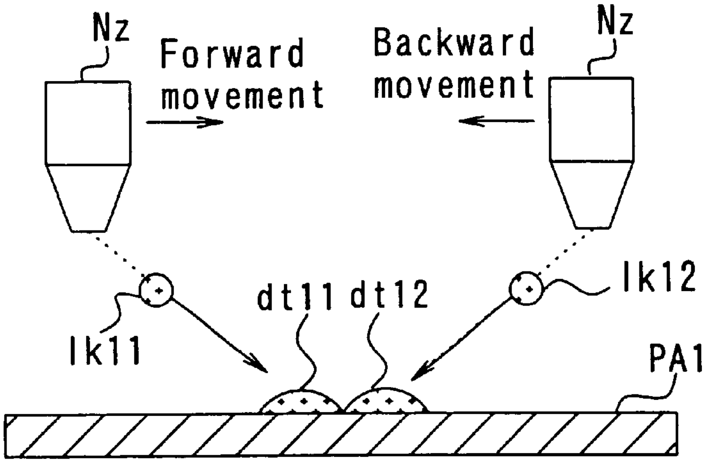
Fig. 13 RELATED ART
FIG. 13 shows a process of causing positional misalignment of the dots in the main scanning direction by the dual-way printing.
Figure 13:
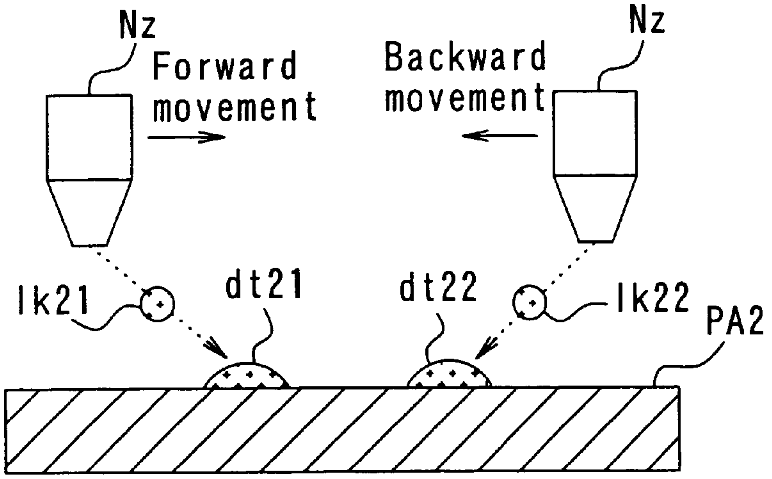
Fig. 13 RELATED ART

As described above, the printer 22 of this embodiment is especially effective in the area filled with a single type of dots, but is also effective in the area where two or more types of dots coexist. The latter example is described with the drawing of FIG. 12. In the example of FIG. 12, the printer 22 of this embodiment creates the two different types of the dots, that is, the medium dots and the small dots, in a uniform manner. By way of example, the medium dots and the small dots may be recorded checkerwise as shown in FIG. 12, in order to form an area of an intermediate tone between the solid area of the medium dots and the solid area of the small dots.

The meanings of the symbols in FIG. 12 and the sheet feeding amounts in the sub-scanning direction in FIG. 12 are identical with those in the example of FIG. 11. In the drawing of FIG. 12, for convenience of explanation, the symbols N1, N2, . . . are affixed to the positions of the dots in the main scanning direction. In the example of FIG. 12, the first main scan Pluses the nozzles No. 12 and No. 13 and creates the medium dots at the positions N1 and N3 in the main scanning direction for the raster lines L1 and L5. After the sub-scan of 8 raster lines, the second main scan P2 uses the nozzles No. 10 through No. 13 and creates the small dots at the positions N2 and N4 in the main scanning direction. The third main scan P3 creates the medium dots at the positions N2 and N4 in the main scanning direction to form a checkerwise pattern. This procedure is repeated to record the dots checkerwise as shown in FIG. 12.

As a matter of convenience of explanation, in the example of FIG. 12, the positions of the medium dots are shown coincident with the positions of the small dots in the main scanning direction. In the actual state, however, the positions of the small dots are deviated from the positions of the medium dots in the main scanning direction. This causes a difference in density between the medium dot and the small dot and thereby forms a pattern of varying density as shown in FIG. 16. In the printer 22 of this embodiment, however, there is no positional misalignment of the medium dots as well as the small dots in the main scanning direction. In the case where dots are created checkerwise as shown in FIG. 12, the dots having the greater density per unit area, that is, the medium dots in this example, have the visually great effects on the varying density of the image. No positional misalignment of the medium dots in the main scanning direction enables the density of the image to be homogeneously recognized with naked eye. The printer 22 of the embodiment thus improves the picture quality in the area where different types of dots coexist. The similar effects can be attained in the area where any two types of dots selected among the large dots, the medium dots, and the small dots coexist or in the area where all the three different types of dots coexist.

In the printer 22 of the embodiment, the above recording technique may be applied for only a specific image area. As described above, the positional misalignment of the dots in the main scanning direction significantly affects the picture quality in the specific area filled with only a single type of dots. The control procedure of the embodiment may thus be adopted for only the specific area. In this case, the conventional dual-way printing technique that creates all the dots in each raster line by one pass of the main scan is applicable for the remaining area. This improves the efficiency of dot creation in the remaining area and thereby enhances the printing speed of a resulting image. Examples of the specific area filled with only a single type of dots include a vertical ruled line formed with only medium dots or large dots and an extremely low tone area expressed with only small dots. These image areas can be identified when the printer driver 96 carries out the color correction or the halftone processing.

In the above embodiment, the CPU 41 included in the printer 22 executes the control procedure for creating dots. This structure enables the printer driver 96 to output the image data of a fixed format, irrespective of the method of dot creation and thereby reduces the processing load of the computer 90. In accordance with another possible structure, the printer driver 96 may set the data for dot creation in the dot creation control routine discussed above. In this case, the dot data to be created in the first main scan, the sheet feeding amount of the sub-scan, the dot data to be created in the second main scan, . . . , are successively transferred to the printer 22. The format of the image data output from the printer driver 96 should be varied according to the method of dot creation. This structure, however, facilitates a change to a later version and enables a new dot recording method to be implemented without changing the PROM 42 and the other related elements of the printer 22.

In the printer of the embodiment, the computer carries out the control of the head to record the dots. Another application of the embodiment is a recording medium, in which a program for actualizing the control procedure is recorded. Available examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media. Still another application of the embodiment is a program supply apparatus that supplies a computer program, which causes the computer to carry out the control procedure of the head and record the dots, to the computer via a communications path.

The present invention is not restricted to the above embodiment or its modifications, but there may be many other modifications, changes, and alterations without departing from the scope or spirit of the main characteristics of the present invention. The above embodiment regards the case in which the respective types of dots having different dot diameters are one-to-one mapped to the moving directions of the head in the main scan. One modification one-to-one maps the respective types of dots created by inks of different densities to the moving directions of the head in the main scan. The principle of the present invention is applicable not only to the color printer with multi-color inks but to the monochromatic printer. The mapping relationship is not restricted to the one-to-one mapping, as long as the raster-forming direction of the main scan can be determined unequivocally for each type of dots. For example, in the case where dots of a larger diameter and a smaller diameter can be created with inks of different densities, that is, a higher-density ink and a lower-density ink, there are a total of four different types of dots, that is, dark large dots, dark small dots, light large dots, and light small dots. In this case, the dark large dots and the light large dots may be created in the course of the forward movement of the head, whereas the dark small dots and the light small dots are created in the course of the backward movement of the head.

It should be clearly understood that the above embodiment is only illustrative and not restrictive in any sense. The scope and spirit of the present invention are limited only by the terms of the appended claims.

What is claimed is:

1. A printing apparatus that carries out a main scan, which moves a head forward and backward relative to a printing medium, and creates a plurality of dots on said printing medium according to input image data, thereby printing an image, said printing apparatus comprising:

said head that enables creation of at least two different types of dots having different densities per unit area;

a storage unit that stores a predetermined relationship between the at least two different types of dots and raster-forming directions of the main scan, wherein the raster-forming directions include a forward direction and a backward direction of the main scan that respectively correspond to the forward movement and the backward movement of said head, the predetermined relationship causing each of the raster-forming directions of the main scan to be mapped to at least one type of dot, wherein there is at least one type of dot created only in either one of the forward direction and the backward direction of the main scan;

a first creation unit that drives said head in the forward direction to create the type of dot mapped to the forward direction of the main scan, based on the predetermined relationship; and a second creation unit that drives said head in the backward direction to create the type of dot mapped to the backward direction of the main scan, based on the predetermined relationship.

2. A printing apparatus in accordance with claim 1, wherein the predetermined relationship further causes each type of dot to be unequivocally mapped to either one of the forward direction and the backward direction of the main scan, as well as causing each of the raster-forming directions of the main scan to be mapped to at least one type of dot.

3. A printing apparatus in accordance with claim 1, wherein the at least two different types of dots comprise at least two different types of dots having different dot diameters.

4. A printing apparatus in accordance with claim 3, wherein the different dot diameters include two dot diameters, and the predetermined relationship stored in said storage unit causes each of the two dot diameters to be one-to-one mapped to the forward direction and the backward direction of the main scan.

5. A printing apparatus in accordance with claim 1, said printing apparatus further comprising:

a third creation unit that drives said head in the forward direction to create the at least two different types of dots, irrespective of the predetermined relationship; and a selection unit that causes said first creation unit and said second creation unit to create dots with respect to a predetermined raster data area of the input image data, wherein the predetermined raster data area affects picture quality of the printed image, said selection unit further causing said third creation unit to create dots with respect to a data area other than the predetermined raster data area.

6. A printing apparatus in accordance with claim 5, wherein the predetermined raster data area of the input image data causes continuous lines to be formed in a direction that crosses the raster-forming directions of the main scan.

7. A method of creating a plurality of dots on a printing medium according to input image data with a head and thereby printing an image, said head enabling at least two different types of dots having different densities per unit area to be created in the course of a forward movement and a backward movement of said head relative to said printing medium, said method comprising the steps of:

(a) determining a type of dot to be created in each of raster-forming directions of a main scan, based on a predetermined relationship stored in a storage unit between the at least two different types of dots and the raster-forming directions of the main scan, wherein the raster-forming directions include a forward direction and a backward direction of the main scan that respectively correspond to the forward movement and the backward movement of said head, the predetermined relationship causing each of the raster-forming directions of the main scan to be mapped to a least one type of dot, wherein there is at least one type of dot created only in either one of the forward direction and the backward direction of the main scan;

(b) driving said head in the forward direction to create the type of dot mapped to the forward direction of the main scan, based on the predetermined relationship; and (c) driving said head in the backward direction to create the type of dot mapped to the backward direction of the main scan, based on the predetermined relationship.

8. A method in accordance with claim 7, wherein the predetermined relationship further causes each type of dot to be unequivocally mapped to either one of the forward direction and the backward direction of the main scan, as well as causing each of the raster-forming directions of the main scan to be mapped to at least one type of dot.

9. A method in accordance with claim 7, wherein the at least two different types of dots comprise at least two different types of dots having different dot diameters.

10. A recording medium, in which a program for causing a printing apparatus to create a plurality of dots on a printing medium according to input image data and thereby print an image is recorded in a computer readable manner, wherein the plurality of dots comprise at least two different types of dots, said program causing a computer to carry out the functions of storing in a storage unit a predetermined relationship between the at least two different types of dots and raster-forming directions of a main scan, wherein the raster-forming directions include a forward direction and a backward direction of the main scan, the predetermined relationship causing each of the raster-forming directions of the main scan to be mapped to at least one type of dot, wherein there is at least one type of dot created only in either one of the forward direction and the backward direction of the main scan; and causing said printing apparatus to create each type of dot in the raster-forming directions of the main scan mapped to the type of dot.

11. A recording medium in accordance with claim 10, wherein the predetermined relationship further causes each type of dot to be unequivocally mapped to either one of the forward direction and the backward direction of the main scan, as well as causing each of the raster-forming directions of the main scan to be mapped to at least one type of dot.

12. A recording medium in accordance with claim 10, wherein the at least two different types of dots comprise at least two different types of dots having different dot diameters.

* * * * *